United States Patent
Bestimt et al.

(10) Patent No.: US 6,320,596 B1
(45) Date of Patent: Nov. 20, 2001

(54) PROCESSING POLYGON STRIPS

(75) Inventors: Jason M. Bestimt, Rancho Cordova; Michael A. Finkel, Folsom, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/256,880

(22) Filed: Feb. 24, 1999

(51) Int. Cl.[7] .................................................. G06T 11/00
(52) U.S. Cl. ............................................................. 345/619
(58) Field of Search .................................... 345/418–422, 345/424, 426, 430, 433, 434, 619; 382/173

(56) References Cited

U.S. PATENT DOCUMENTS

| | | |
|---|---|---|
| 4,870,599 | 9/1989 | Hempel et al. . |
| 5,363,475 | 11/1994 | Baker et al. . |
| 5,574,835 | 11/1996 | Duluk, Jr. et al. . |
| 5,579,454 | 11/1996 | Billyard et al. . |
| 5,596,686 | 1/1997 | Duluk, Jr. . |
| 5,898,437 | * 4/1999 | Deolaliker ............................ 345/421 |
| 5,903,272 | 5/1999 | Otto . |
| 5,999,187 | * 12/1999 | Dehmlow et al. .................. 345/420 |
| 6,088,035 | 7/2000 | Sudarsky et al. . |
| 6,115,050 | * 9/2000 | Laudau et al. ....................... 345/433 |

OTHER PUBLICATIONS

Patent application Ser. No. 09/252,396 Dated Feb. 18, 1999 Entitled "Processing Polygon Strips".

* cited by examiner

Primary Examiner—Almis R. Jankus
Assistant Examiner—G. F. Cunningham
(74) Attorney, Agent, or Firm—Trop, Pruner & Hu, P.C.

(57) ABSTRACT

A method for forming an image of an object on a display of a computer includes representing at least a portion of the object with a first strip of polygons that is described by a first set of points of a first coordinate space. One or more polygons of the first strip that will be invisible in the image are selected, and these polygons are culled from the first strip to form a second strip of polygons. The second strip of polygons is described by a second set of points of the first coordinate space. The culling is performed before the points of the second set are transformed into another coordinate space that is associated with the image.

17 Claims, 5 Drawing Sheets

PROCESSING POLYGON STRIPS

BACKGROUND

The invention relates to processing polygon strips, such as triangle strips, for example.

There are many ways for a computer system to represent three-dimensional (3-D) objects. For example, the computer system may use polygon meshes to represent the surfaces of the 3-D objects. One type of polygon mesh may include at least one triangle strip 8 (see FIG. 1) that is a collection of connected triangles 12 that are organized in a manner to minimize the number of vertices 9 that are used to describe the triangles 12. More particularly, a triangle may be described by three vertices, and thus, n triangles may be described by n*3 vertices. However, for the triangle strip 8, each triangle 12 shares a common edge with another triangle 12, an arrangement that permits n triangles to be described by n+2 vertices. In this manner, the triangle strip 8 (having sixteen triangles 12) may be described by the following vertex list (having 18 vertices):

{9a, 9b, 9c, 9d, 9e, 9f, 9g, 9h, 9i, 9j, 9k, 9l, 9m, 9n, 9o, 9p 9q, 9r}

The triangle strip 8 may have a winding order (i.e., the triangle strip 8 may be "ordered"), a designation that implies that the vertices of each triangle 12 appear in a sequence (in the vertex list) that indicates the direction of the surface normal of the triangle 12. In this manner, the triangle strip 8 typically is not planar (as depicted in FIG. 1 for purposes of simplicity), but rather, the triangle strip 8 may follow a non-planar path in 3-D space. As an example, a surface of a particular triangle 12 may form part of an object's exterior surface and as a result, may have a surface normal that points in a direction away from the exterior surface. Thus, the order in which the vertices associated with a particular triangle 12 appear in the vertex list may govern which surface of the triangle 12 forms part of the object's exterior surface.

More particularly, when the computer system processes the above-described vertex list to render an image of the triangle strip 8, the computer system may initially draw a triangle 12a that has the vertices 9a, 9b and 9c and is bounded by a conceptual piecewise parametric curve 5 that extends through the vertices 9a, 9b, and 9c. The direction (clockwise or counterclockwise) of a parametric curve (such as the parametric curve 5) may be determined by the order in which the vertices are connected to form the curve, and the direction of the curve may govern which surface of the triangle is an exterior surface, as described below.

The winding order of the triangle strip 8 effectively alternates the applications of the right hand and left hand rules to the parametric curves (that bound the triangles 12) to determine the directions of the surface normals. For example, to form the leftmost triangle 12a of the strip 8, the computer system may connect the first three vertices {9a, 9b,9c} together in the order (a left-to-right order, for example) that is defined by the sequence in which the vertices appear in the vertex list described above: vertex 9a to vertex 9b to vertex 9c to vertex 9a (to close the curve). Thus, the resultant parametric curve 5 has a counterclockwise orientation (as depicted in FIG. 1). Applying the right hand rule, the surface normal of the triangle 12a points out of the page, for example. It is noted that if the leftmost triangle is alternatively defined by the vertex sublist {9a,9c, 9b}, then the resultant parametric curve (given the drawing order described above) has a clockwise (instead of a counterclockwise) orientation, and thus, applying the right hand rule, the surface normal of the triangle points into the page.

As another example, the next triangle 12b to the right of the triangle 12a is defined by one additional vertice 9d that, when combined with the vertex sublist {9b,9c} (i.e., the two prior vertices of the vertex list), causes the computer system to form a conceptual parametric curve 6 in the following manner: vertex 9b to vertex 9c to vertex. 9d to vertex 9b. Thus, the parametric curve 6 has a clockwise orientation, and the winding order ensures that the left hand rule applies (because of the alternating applications of the left hand and right hand rules) to determine the direction of the surface normal. Thus, applying the left hand rule to the parametric curve 6, the surface normal of the triangle 12b points out of the page.

Three dimensional objects may be defined in an object space by a mesh of multiple triangle strips that are oriented in various directions, and the computer system may process the vertex lists that define the triangle strips to transform the vertices into a two-dimensional (2-D) screen space for display. As an example, the computer system may represent a portion of an exterior surface of a sphere 9 (in an object space) by a triangle strip 8a, as depicted in FIG. 2. When transformed into screen coordinates as seen through a viewing window 7, a portion 8aa of the strip 8a may be visible, and another portion 8ab of the strip 8a may be invisible. Unfortunately, the computer system may consume a considerable amount of time processing triangles, such as the triangles that form the portion 8ab, that do not ultimately appear in the 2-D screen space. These additional computations (e.g., transformations of the vertices from one coordinate space to another coordinate space), in turn, may degrade performance of the computer system.

Thus, there is a continuing need for an arrangement that reduces the number of polygons that are processed by a computer system but do not appear in the final image that is rendered by the computer system.

SUMMARY

In one embodiment, a method for forming an image of an object on a display of a computer includes representing at least a portion of the object with a first strip of polygons that is described by a first set of points of a first coordinate space. One or moret polygons of the first strip that will be invisible in the image are selected, and these polygons are culled from the first strip to form a second strip of polygons. The second strip of polygons is described by a second set of points of the first coordinate space. The culling is performed before the points of the second set are transformed into another coordinate space that is associated with the image.

DETAILED DESCRIPTION

Figure 1:
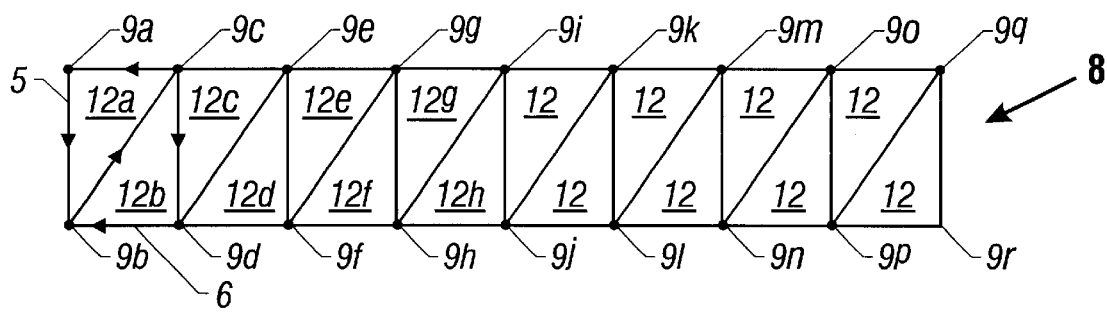
FIGS. 1, 4, 5, and 6 are illustrations of triangle strips.
Figure 2:
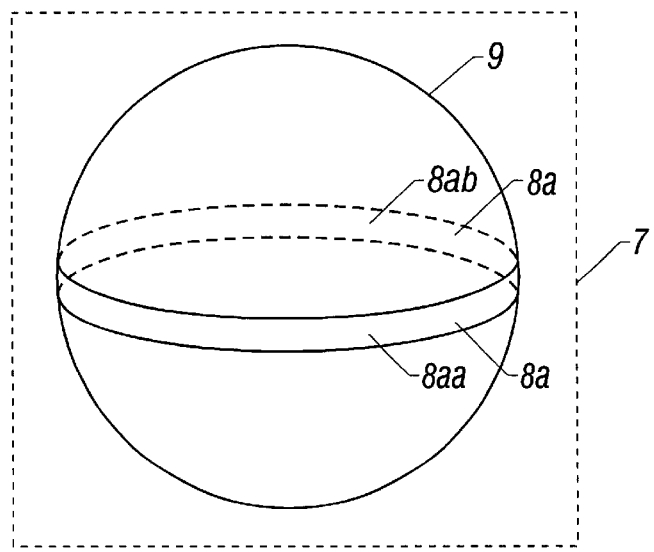
FIG. 2 is a perspective view of a sphere.
Figure 3:
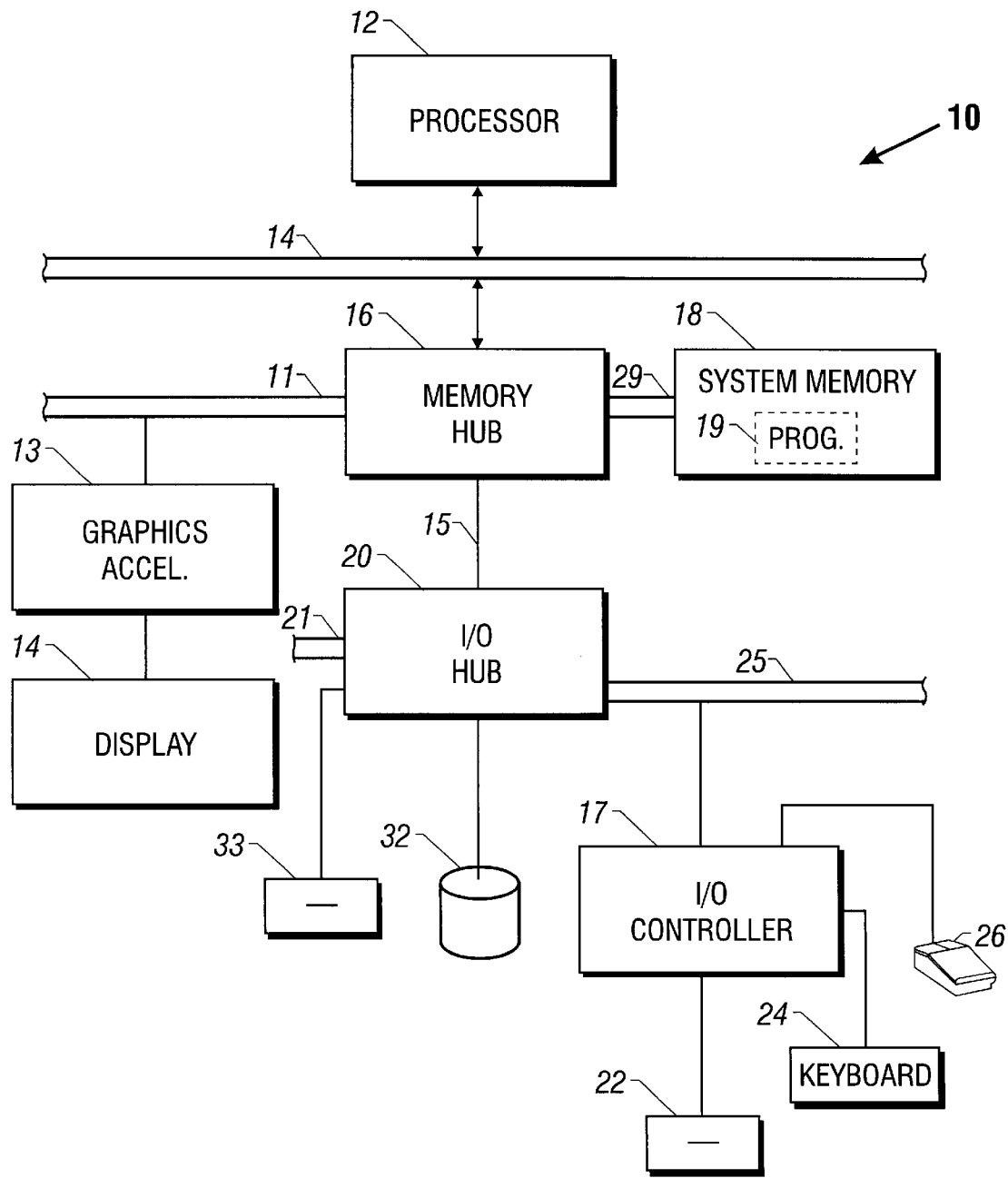
FIG. 3 is a schematic diagram of a computer system according to an embodiment of the invention.
Figure 4:
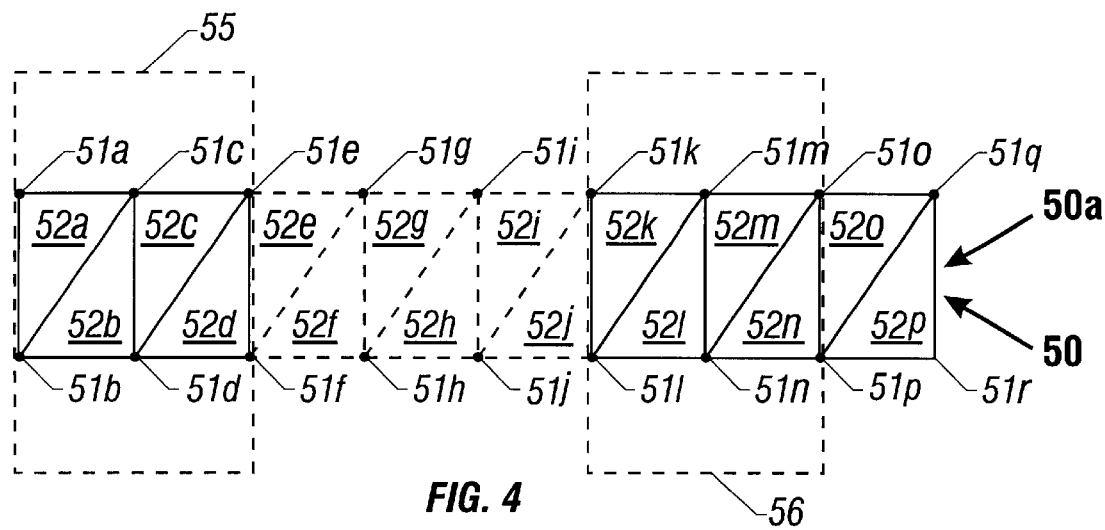
Figure 5:
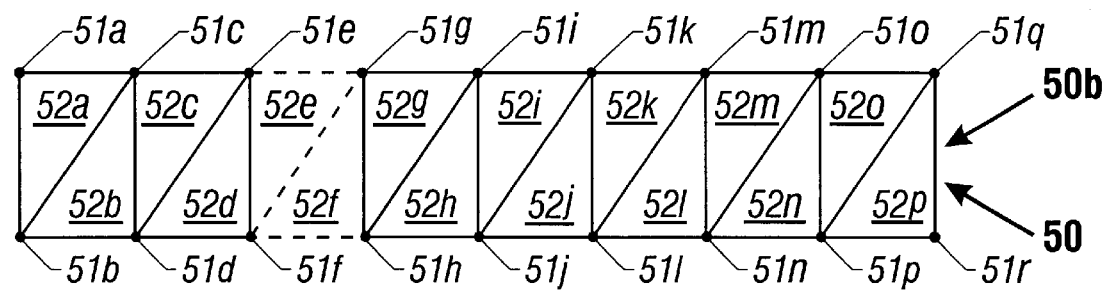

Referring to FIGS. 3 and 4, an embodiment 10 of a computer system in accordance with the invention includes a system memory 18 that stores a triangle preculling program 19. In some embodiments, the preculling program 19, when executed by a processor 12 (a central processing unit (CPU), for example), causes the processor 12 to process a vertex list that describes a triangle strip 50 (a triangle strip 50*a* (see FIG. 4), a triangle strip 50*b* (see FIG. 5) or a triangle strip 50*c* (see FIG. 6), as examples) for purposes of removing, or culling, triangles that do not appear in a final two-dimensional (2-D) pixel plane image (of a 2-D screen space) of the strip 50 on a display 14. For example, triangles 52*e*, 52*f*, 52*g*, 52*h*, 52*i* and 52*j* of the triangle strip 50*a* may not appear in the screen space (as indicated by the dashed lines) due to the invisibility of these triangles as seen through a camera viewing window. Stated differently, the normal of the surface of the triangle 52*e*, 52*f*, 52*g*, 52*h*, 52*i* or 52*j* may not have a component in the same direction as the surface normal of the viewing window, a normal that typically points in a perpendicular direction away from the window and toward the viewer of the pixel plane image.

In a typical computer system, a processor may process the entire vertex list (that describes the triangle strip 50*a*) by performing transformations of the vertices to convert the vertices from a three-dimensional (3-D) object space into the screen space. However, by doing this, the processor may perform unnecessary computations in transforming some of the vertices of the triangles 52*e*, 52*f*, 52*g*, 52*h*, 52*i* and 52*j*, as some of these vertices do not ultimately appear in the screen space.

Unlike the conventional arrangement described above, the preculling program 19 causes the processor 12 to cull, or remove, vertices from the vertex list that do not appear in the screen space prior to transformations of the vertices, hereinafter referred to as "preculling." For example, for the triangle strip 50*a*, the triangles 52*e*, 52*f*, 52*g*, 52*h*, 52*i* and 52*j* have vertices 51*g*, 51*h*, 51*i* and 51*j* that do not appear in the screen space. In this manner, in response to this condition, the preculling program 19 may cause the processor 12 to precull the vertices 51*g*, 51*h*, 51*i* and 51*j* from the vertex list before the processor 12 performs coordinate transformations and further processing of the triangle strip 50*a*. However, as a result of the preculling, the processor 12 does not perform mathematical computations on vertices (and triangles 52) that are invisible, or do not appear, in the screen space. Due to the decrease in the number of computations, the effective speed at which the processor 12 renders 3-D images may be enhanced.

In the context of this application, the phrase "computer system" may generally refer to a system that includes a processor and may include (but is not limited to) a graphics system, a desktop computer or a mobile computer (a laptop computer, for example), as just a few examples. The term "processor" may refer to, as examples, at least one central processing unit (CPU), microcontroller, X86 microprocessor, Advanced RISC Machine (ARM) microprocessor or Pentium microprocessor. The examples given above are not intended to be limiting, but rather, other types of computer systems and other types of processors may be included in embodiments of the invention.

In some embodiments, preculling of triangles (and vertices) may not be used in cases where only one or two triangles 52 do not appear in the screen space. For example, referring to FIG. 5, in the triangle strip 50*b*, two triangles 52*e* and 52*f* do not appear in the screen space. However, the four vertices 51*e*, 51*f*, 51*g* and 51*h* that describe the triangle's 52*e* and 52*f* do appear in the screen space and thus, are processed anyway because of their inclusion in adjacent triangles 52*c*, 52*d*, 52*g* and 52*h*. Similarly, preculling just one triangle 52 does not remove any visible vertices. As a result of these observations, in some embodiments, preculling is not performed on one or two adjacent invisible triangles 52 that will not appear in the screen space.

In some embodiments, when the processor 12 culls triangles 52 from a triangle strip 50, the processor 12 (under control of the preculling program 19) takes measures to ensure that a particular triangle strip 50 is not effectively subdivided into multiple triangle strips 50, a condition that may increase the processing time beyond that used for the original triangle strip 50. In particular, the preculling program 19 may cause the processor 12 to pad the associated vertex list with dummy vertices to effectively add null triangles to the original triangle strip 50. A null triangle may be defined as a triangle 52 that has at least two vertices that are the same. In this manner, the null triangles may be viewed as space holders that prevent a triangle strip from being subdivided into multiple triangle strips.

As an example of the padding, referring back to FIG. 4, the processor 12 may derive the vertex list for the triangle strip 50*a* (in which six triangles 52*e*, 52*f*, 52*g*, 52*h*, 52*i* and 52*j* are invisible in the screen space to form visible substrips 55 and 56) in the following manner. First, the processor 12 may pad the end of the vertex list that describes the substrip 55 (formed from the triangles 52*a*, 52*b*, 52*c* and 52*d*) with the last vertex 51*f* of the substrip 55. This action creates a vertex list {51*a*,51*b*,51*c*,51*d*,51*e*,51*f*,51*f*} that describes one null triangle i.e., the triangle with vertices 51*e*, 51*f* and 51*f*. Next, the processor 12 may pad the beginning of the vertex list that describes the substrip 56 (formed from the triangles 52*k*, 52*l*, 52*m*, 52*n*, 52*o* and 52*p*) with the first vertex 51*k* of the substrip 56. This action creates a vertex list {51*k*,51*k*, 51*l*,51*m*,51*n*,51*o*,51*p*,51*q*,51*r*} that describes one null triangle i.e., the triangle with vertices 51*k*, 51*k* and 51*l*. Subsequently, the processor 12 may concatenate the padded vertex lists that are associated with the substrips 55 and 56 to form the followings vertex list:

{51*a*,51*b*,51*c*,51*d*,51*e*,51*f*,51*f*,51*k*, 51*k*,51*l*,51*m*,51*n*,51*o*,51*p*,51*q*, 51*r*}

Thus, the above-described vertex list describes four null triangles: a null triangle described by the vertex list {51*e*, 51*f*,51*f*}; a null triangle described by the vertex list {51*f*, 51*f*,51*k*}; a null triangle described by the vertex list {51*f*, 51*k*, 51*k*}; and a null triangle described by the vertex list {51*k*,51*k*,51*l*}.

If the number of ultimately invisible triangles is even, the processor 12 may concatenate multiple vertex sublists in a similar manner by adding one vertex to the end of one vertex sublist and adding one vertex to the beginning of the adjacent vertex sublist. This even padding preserves the winding order of the original triangle strip. However, if the number of ultimately invisible triangles is odd, as depicted in FIG. 6, then the processor 12 may add one additional dummy vertex (i.e., to create an odd number of dummy vertices) to preserve the winding order.

Figure 6:
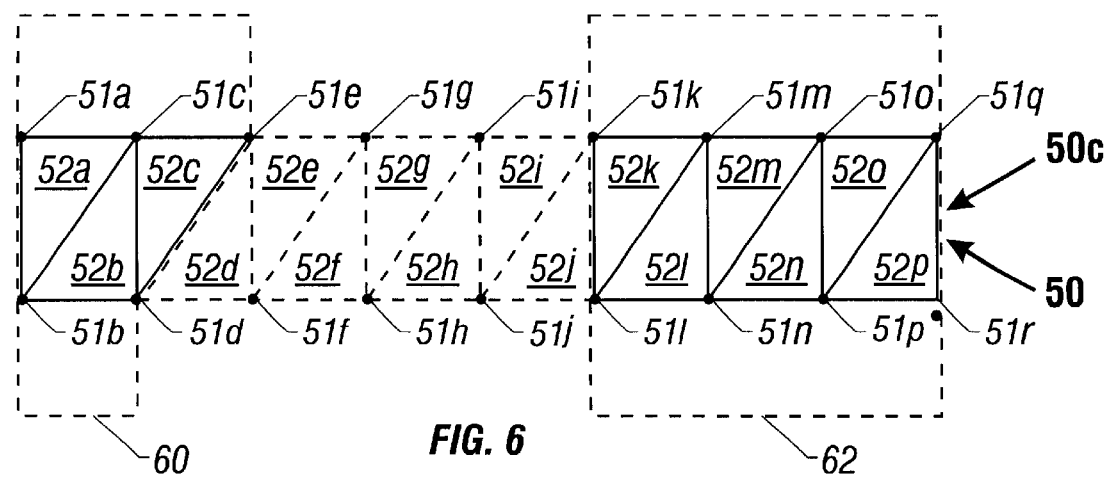

For example, referring to FIG. 6, the triangle strip 50*c* may have triangles 52*d*, 52*e*, 52*f*, 52*g*, 52*h*, 52*i* and 52*j* (i.e., an odd number of triangles 52) that are not visible in the final image to create the visible substrips 60 and 62. In response to this condition, the preculling program 19 may cause the processor 12, in turn, to concatenate a vertex list {51*a*,51*b*, 51*c*,51*d*,51*e*} that describes the substrip 60 with a vertex list {51*k*,51*l*,51*m*,51*n*,51*o*,51*p*,51*q*,51*r*} that describes a substrip 62 to produce the following vertex list:

{51*a*,51*b*,51*c*,51*d*,51*e*,51*e*,51*e*,51*k*,51*k*, 51*l*,51*m*,51*n*,51*o*,51*p*,51*q*, 51*r*}

Thus, the above described list has three dummy vertices and five null triangles, the case when an odd number (greater than one) of triangles 52 are omitted.

Figure 7:
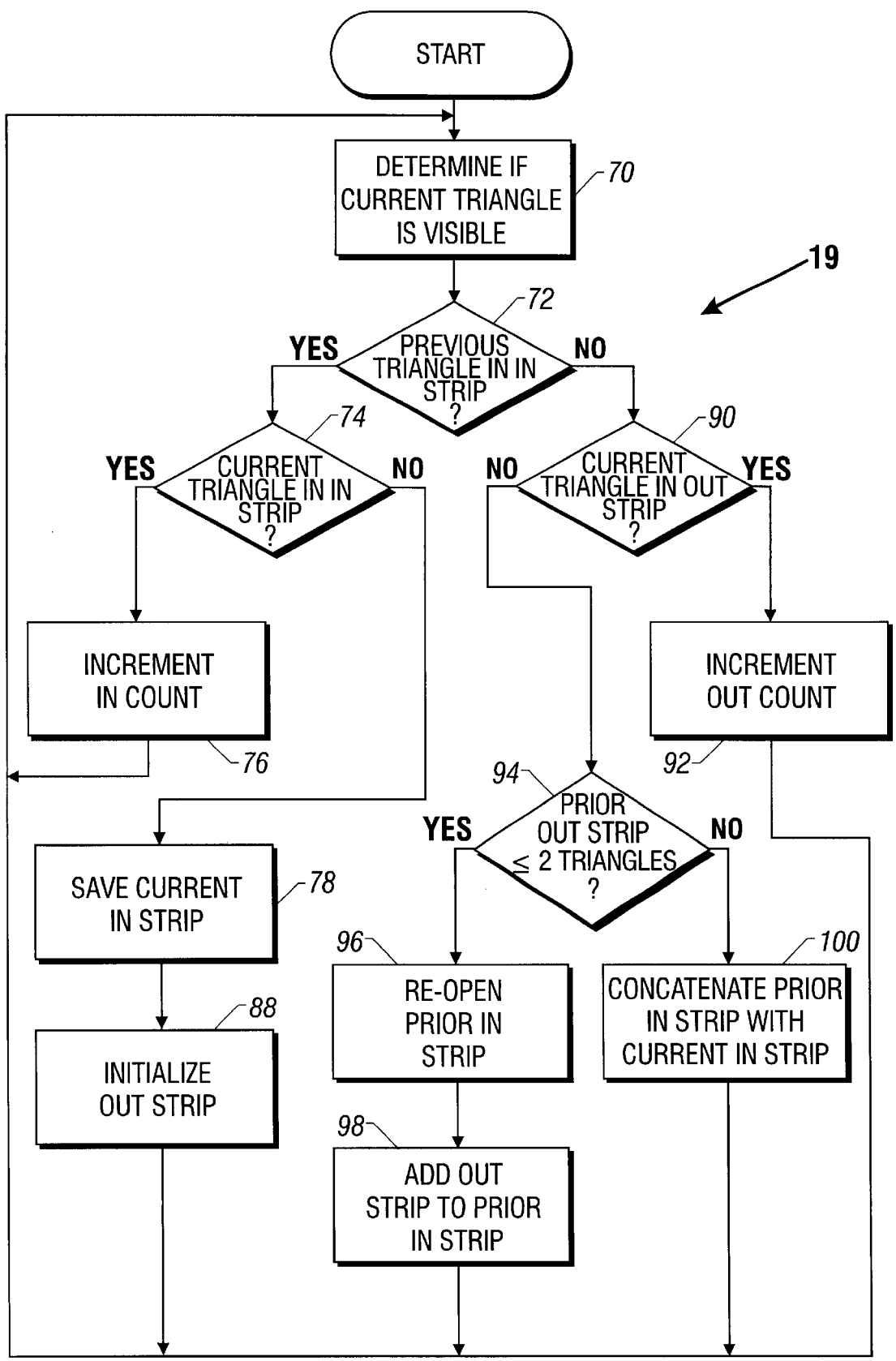
FIGS. 7 and 8 are flow diagrams illustrating execution of a preculling program by a processor of the computer system of FIG. 3.

Referring to FIG. 7, in some embodiments, the preculling program 19 may cause the processor 12 to traverse the vertices of a particular vertex list in a sequential order, beginning (in a left-to-right order) with the first vertex of the vertex list. In this manner, the processor 12 may determine (block 70) if the current triangle 52 being processed will be visible in the screen space. The processor 12 may determine this by, for example, taking a dot product of the surface normal of the triangle 52 and the normal of a camera space viewing window. If the processor 12 determines (diamond 72) from the dot product that the previous triangle was visible in an "in strip" (described below), then the processor 12 may determine (diamond 74) if the current triangle is included in an "in strip."

In this manner, the term "in strip" may effectively be a vertex list that describes a contiguous substrip of visible triangles that is found by the processor 12 (on an ongoing basis) as the processor 12 traverses the original triangle strip 50. The processor 12 may use a vertex list to describe the in strip, for example. The processor 12 may similarly create an "out strip" that effectively may be a vertex list that describes a contiguous substrip of triangles that do not appear in the final image. Thus, while processing a particular triangle strip, the processor 12 may describe the triangle strip by one or more in strips and one or more out strips.

If the processor 12 determines (diamond 74) that the current triangle 52 is in an in strip, then the processor 12 increments (block 76) a count (called an "in count") of the number of triangles that appear in the current in strip and returns to block 70. If the current triangle is not in the current in strip, then the processor 12 may store, or save (block 78), indications of the vertex list that describe the current in strip, as the processor 12 has reached the end of the current end strip and the beginning of an out strip. Upon this occurrence, the processor 12 may initialize (block 88) the new out strip and transition to block 70.

If the processor 12 determines (diamond 72) that the previous triangle is not part of an in strip, then the processor 12 determines (diamond 90) if the current triangle is in an out strip. If so, the processor 12 may increment (block 92) a count (called an "out count") that indicates the number of triangles in the current out strip and return to block 70. Otherwise, if not, the processor 12 may determine (diamond 94) if the previous out strip has just one or two triangles 52. If so, the processor 12 may re-open (block 96) the prior in strip and add (block 98) the current out strip to the prior in strip. Otherwise, the processor 12 may concatenate (block 100) the prior in strip with the current in strip.

Figure 8:
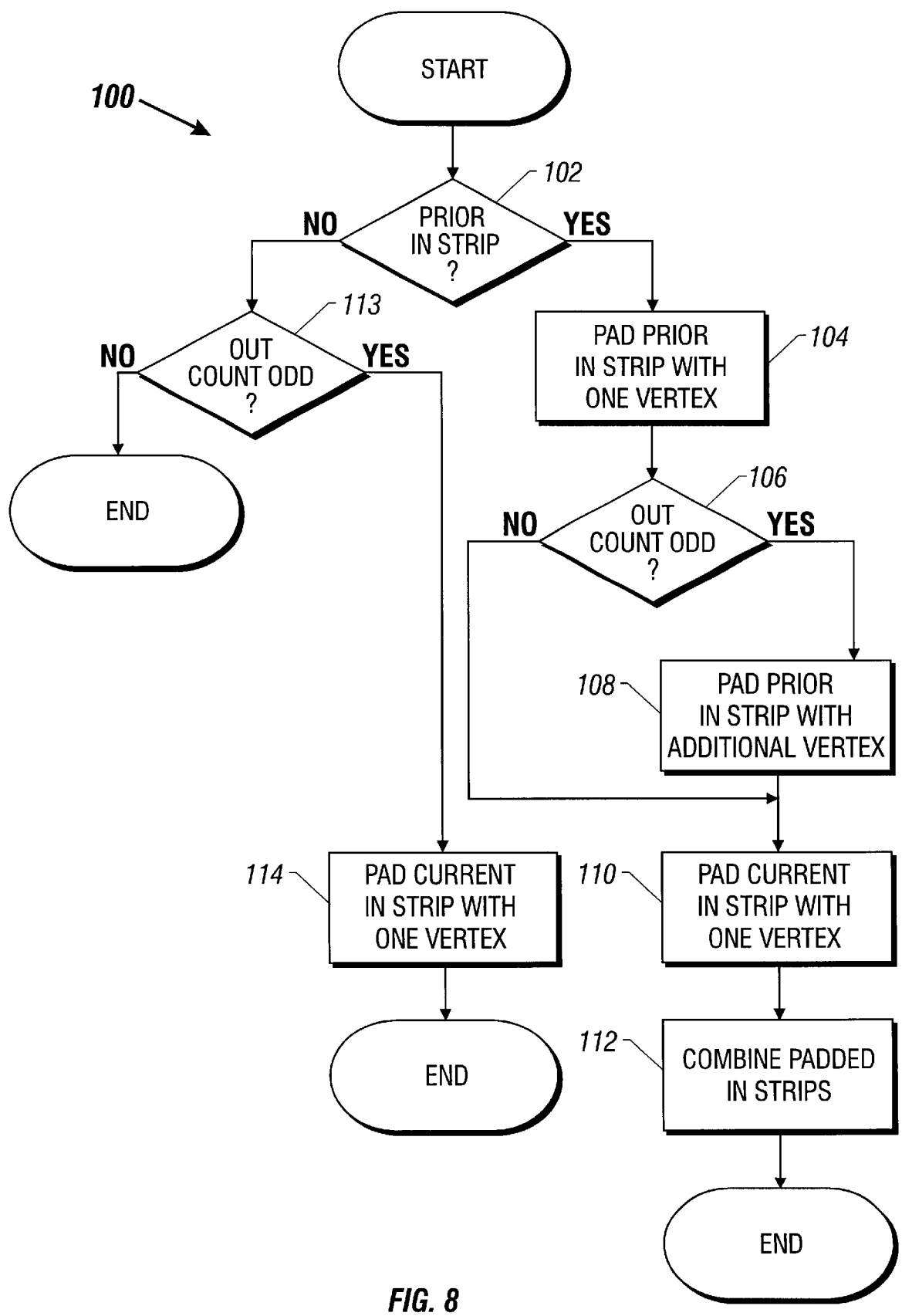

Referring to FIG. 8, to perform the concatenation, the processor 12 may determine (diamond 102) if there is a prior in strip to combine with the current in strip. If so, the processor 12 may pad (block 104) the prior in strip 104 with one vertex. If the processor 12 subsequently determines (diamond 106) that the out count is odd, then the processor 12 pads (block 108) the prior in strip with an additional vertex. The processor 12 may then pad (block 110) the current in strip with one vertex and subsequently, combine (block 112) the padded in strips to form a concatenated in strip.

If the processor 12 determines (diamond 102) that no prior in strip is available, the processor 12 may then determine (diamond 113) if the out count is odd. If so, the processor 12 may pad (block 114) the current in strip with one vertex to preserve the winding order. After concatenating the prior in strip (if any) with the current in strip, the processor may return to block 70, as depicted in FIG. 7.

Referring back to FIG. 3, in some embodiments, the computer system 10 may include a bridge, or memory hub 16, and the processor 12 and the memory hub 16 may be coupled to a host bus 14. The memory hub 16 may provide interfaces to couple the host bus 14, a memory bus 29 and an Accelerated Graphics Port (AGP) bus 11 together. The AGP is described in detail in the Accelerated Graphics Port Interface Specification, Revision 1.0, published on Jul. 31, 1996, by Intel Corporation of Santa Clara, Calif. The system memory 18 may be coupled to the memory bus 29, and a graphics accelerator 13 may be coupled to the AGP bus 11. The display 14 may be driven by signals that are furnished by a graphics accelerator 13. A hub communication link 15 may couple the memory hub 16 to another bridge circuit, or input/output (I/O) hub 20.

In some embodiments, the I/O hub 20 includes interfaces to an I/O expansion bus 25 and a Peripheral Component Interconnect (PCI) bus 21. The PCI Specification is available from The PCI Special Interest Group, Portland, Oreg. 97214. The I/O hub 20 may also include interfaces to a hard disk drive 32 and a CD-ROM drive 33, as examples. An I/O controller 17 may be coupled to the I/O expansion bus 25 and receive input data from a keyboard 24 and a mouse 26, as examples. The I/O controller 17 may also control operations of a floppy disk drive 22. Copies of the program 19 may be stored on, as examples, the hard disk drive 32, a removable diskette (for the floppy drive 22, for example) or a CD-ROM (for the CD-ROM drive 33, for example), as just a few examples.

Other embodiments are within the scope of the following claims. For example, the above-describe techniques may be applied to polygon meshes other than triangle strips, and the polygons may be polygons other than triangles. As another example, in some embodiments, the transformation between the coordinate systems may be performed by a graphics accelerator instead of the processor 12.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for forming an image of an object on a display of a computer system, comprising:

representing at least a portion of the object with a first strip of polygons described by a first set of points of a first coordinate space;

selecting one or more polygons of the first strip that will be invisible in the image; and culling said one or more polygons from the first strip to form a second strip of polygons described by a second set of points of the first coordinate space, the culling being performed before the points of the second set are transformed into another coordinate space associated with the image and the culling comprising:

padding the first set of points with redundant points to form the second set of points.

2. The method of claim 1, wherein the act of culling comprises:

removing one or more points of the first set of points to form the second set of points, said one or more points being associated with said one or more polygons.

3. The method of claim 1, further comprising:

basing the padding on whether the number of said one or more polygons is odd.

4. The method of claim 1, wherein the first set of points comprises vertices of the polygons of the first strip.

5. An article comprising a storage medium readable by a processor-based system, the storage medium storing instructions to cause a processor to:

represent at least a portion of an object with a first strip of polygons described by a first set of points of a first coordinate space, select one or more polygons of the first strip that will be invisible in an image of the object to be formed on a display of the system, cull said one or more polygons from the first strip to form a second strip of polygons described by a second set of points of the first coordinate space before the points of the second set are transformed into another coordinate space associated with the image, and pad the first set of points with redundant points to form the second set of points.

6. The article of claim 5, the storage medium storing instructions to cause the processor to:

remove one or more points of the first set of points to form the second set of points, said one or more points being associated with said one or more polygons.

7. The article of claim 5, the storage medium storing instructions to cause the processor to:

base the padding on whether the number of said one or more polygons is odd.

8. A computer system comprising:

a display adapted to form an image of an object, and a processor adapted to:

indicate a first strip of polygons in a first coordinate space to represent at least a portion of an object, select one or more polygons of the first strip that will be invisible in the image, cull said one or more polygons from the first strip to indicate a second strip of polygons described by a second set of points of the first coordinate space before the points of the second set are transformed into another coordinate space being associated with the image, and pad the first set of points with redundant points to form the second set of points.

9. The computer system of claim 8, wherein the processor is further adapted to remove one or more points of the first set of points to form the second set of points to cull said one or more polygons, said one or more points being associated with said one or more polygons.

10. The computer system of claim 8, wherein the processor is further adapted to base the padding on whether the number of said one or more polygons is odd.

11. The method of claim 1, wherein the first strip comprises a triangle strip.

12. The method of claim 1, further comprising:

transferring the second set of points into a third set of points being associated with a screen space; and using the third set of points to form the image.

13. The article of claim 5, wherein the first strip comprises a triangle strip.

14. The article of claim 5, the storage medium storing instructions to cause the processor to:

after the culling, transform the second set of points into a third set of points being associated with a screen space, and use the third set of points to form the image.

15. The computer system of claim 8, wherein the first set of points comprises vertices of the polygons of the first strip.

16. The computer system of claim 8, wherein the first strip comprises a triangle strip.

17. The computer system of claim 8, wherein the first strip comprises an ordered triangle strip.

* * * * *